United States Patent

Baumann et al.

[11] Patent Number: 5,740,294
[45] Date of Patent: Apr. 14, 1998

[54] OPTICAL SOUND HEAD COMBINED WITH A SOUND FILM PROJECTOR

[75] Inventors: Hans Baumann, Raisdorf; Jürgen Perkams, Probsteierhagen, both of Germany

[73] Assignee: Raytheon Anschuetz GmbH, Kiel, Germany

[21] Appl. No.: 654,177

[22] Filed: May 28, 1996

[30] Foreign Application Priority Data

Jun. 9, 1995 [DE] Germany ............ 195 21 034.4

[51] Int. Cl.$^6$ ............ G02B 6/36; H01S 3/18; G03B 31/00
[52] U.S. Cl. ............ 385/93; 385/92; 385/94; 385/33; 385/147; 372/43; 352/11; 352/12; 352/25; 352/34
[58] Field of Search ............ 385/88, 92, 93, 385/94, 147, 33; 372/43, 50; 352/11, 12, 8, 9, 24, 25, 26, 27, 28, 34, 37

[56] References Cited

U.S. PATENT DOCUMENTS

| | | | |
|---|---|---|---|
| 3,746,438 | 7/1973 | Misawa et al. | 352/14 |
| 4,200,363 | 4/1980 | Olodort | 352/27 |
| 4,577,302 | 3/1986 | Allen | 352/27 |
| 5,074,682 | 12/1991 | Uno et al. | 385/93 |
| 5,155,510 | 10/1992 | Beard | 352/27 |
| 5,386,255 | 1/1995 | Beard et al. | 352/5 |

*Primary Examiner*—Brian Healy
*Attorney, Agent, or Firm*—Shlesinger Fitzsimmons Shlesinger

[57] ABSTRACT

An optical sound head (L), comprising a red laser diode (11) and a inspection window (90), allowing easy functional inspection, but also simple adjustment during manufacture. The laser diode (11) and all optical (10) and electronic (20) assemblies to be adjusted to a specimen, are accommodated in a replaceable assembly (1), for easy and repeatable (A) replacement. A minimum signal-to-noise ratio for analogue sound scanning is achieved by an additional aperture (15), reducing the light intensity applied to the center of an aperture slot (8). Both apertures (8, 15) are preferably designed as unsupported, laser-cut metal sheets.

11 Claims, 2 Drawing Sheets

OPTICAL SOUND HEAD COMBINED WITH A SOUND FILM PROJECTOR

BACKGROUND OF THE INVENTION

Optical sounds head and sound film projectors equipped with the same are prior art. For some time, analogue and digital sound film replay systems were using lamps for light sources. Due to advantages such as reduced heat loads and improved signal-to-noise ratios, even infrared laser diodes have been used.

An example for this is a digital sound system according to EP 0 574 239. EP 0 295 687, too, describes a sound film system based on a laser diode of 0.78 μm wavelength, i.e. towards the limits of the infrared spectrum. In this case, mirror lenses are provided, with considerable adjustments (claims 4, 11) being required. Conventional sound film systems for analogue and digital sound and the function of an optical sound head have been described in detail, therefore being omitted here. In the production of optical sound heads, infrared laser diodes have the disadvantage that they cannot be visually adjusted. Often, too, a light source is accommodated inside the capstan and therefore not easily accessible.

Although the life of laser diodes is long, it is limited, and failure of an infrared laser diode cannot be directly detected by the projectionist. Fast repairs are therefore doomed due to the necessity of having to adjust the infrared beam.

It is an object of the present invention to provide an optical sound head including a laser diode, allowing fast, fault finding should the laser diode fail and remedy the said fault by simple replacement, in addition to easy manufacture.

SUMMARY OF THE INVENTION

The object is achieved by an optical sound head according to claim 1, allowing easy inspection of operation by visible light, an inspection window and an replaceable assembly allowing replacement of the laser diode without adjusting the sound film projector.

Advantageous embodiments are the subject of sub-claims 2 to 7.

According to claim 2, electrical assemblies will also be included in the replaceable assembly. It is general knowledge that commercial laser diodes are subject to manufacturing tolerances requiring optical, thermal and electronic adjustment. Thermal adjustment is usually effected by an electric Peltier cooling system. In this case, the replaceable assembly according to the invention will include all components requiring adjustment, with all adjustments being provided during manufacture in the factory.

The harmonic distortion of analogue sound transmission in particular is more or less minimised by an additional aperture being provided between the laser diode and the aperture slot, homogenising the distribution of intensity over the length of the slot.

A sound film projector is advantageously designed according to sub-claims 8 or 9.

The invention will be described hereafter by means of a drawing, wherein:

DETAILED DESCRIPTION OF THE INVENTION

Figure 1:
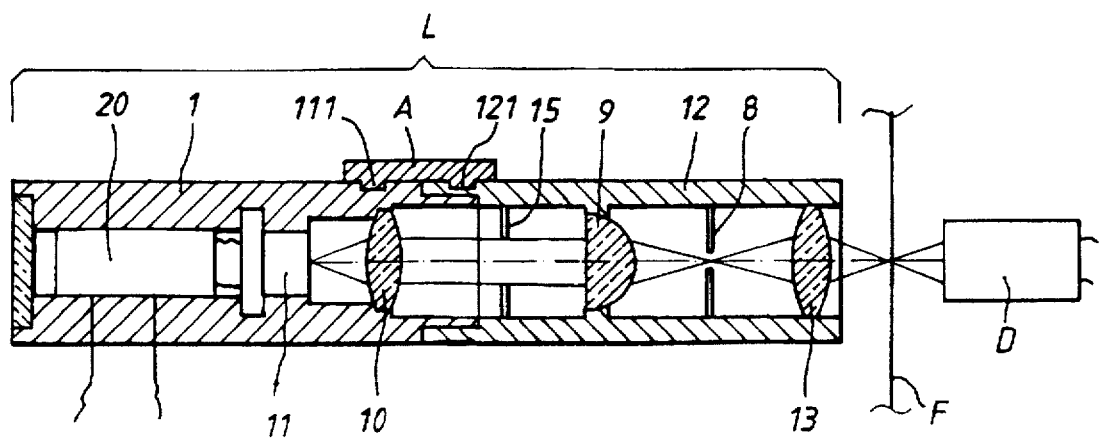
FIG. 1 is a diagrammatic cutout from a sound film projector including a longitudinal section of an optical sound head, a sound film and a detector.

In the example of FIG. 1, the replaceable assembly 1 is of a tubular design, including a laser diode 11, emitting red light, in this case of 670 nm, and being a commercial brand, such as a Toshiba or Philips diode and a collimator lens 10. Furthermore, an electronic assembly 20 is included in the same, containing all electronic components fitting the model of the said laser diode 11 for the electronic operating system of the said laser diode 11.

Another tubular assembly 12, firmly installed in the sound film projector, includes a cylindrical lens 9, an aperture slot 8 and a lens 13, which may be a single liens, owing to the light source—the laser diode 11—being a narrow-band source. The replaceable assembly 1 and the tubular assembly 12 include sockets 111 and 121, allowing together with a stop A, repeatable disconnection and connection of both components 1, 12, i.e. even when replacing the specimen of the replaceable assembly 1 by a spare part. Together with the components contained in them, the assemblies 1 and 12 are forming the optical sound head L.

As this is common practice for the said assemblies, the laser diode 11 includes an elliptical divergence distributor, arranged to allow minimum divergence in the optical plane of FIG. 1 and the collimator lens 10, making this an elliptical parallel beam. The axis of the cylinder lens 9 is also provided vertical to the plane of the drawing, allowing it to reflect a very low and wide image of the light source 11 on the aperture slot. The aperture slot 8 is therefore lit with high efficiency. The lens 13 is providing a reduced image of the aperture slot 8 on the film F, with the digital and/or analogue sound track being exposed by an accurate, well-defined, narrow strip. With digital sound, the width is not determined by the required frequency, but by the pixel size to be exposed, being usually of a magnitude of 12×12 μm $^2$. The photo detector D, which may include filters, a lens and similar and CCD Arrays or rows of diodes, is therefore able to receive a high-quality sound signal.

In this arrangement, a certain variation of light intensity remains over the length of the slot 8, due to emphasising the centre of the elliptical divergence distribution. Intensity in the slot 8 may be further homogenised by a preceding aperture 15, eliminating light components removed from the axis, close to the drawing plane of FIG. 1 in a spatially different way, as shown below, further improving the signal-to-noise ratio of the playback.

The preferred location of the additional aperture 15 is in the parallel elliptical light ray prior to the cylinder lens 9 in order to keep the replaceable assembly 1, mounted in the tubular assembly 12, simple and at low cost.

Figure 2:
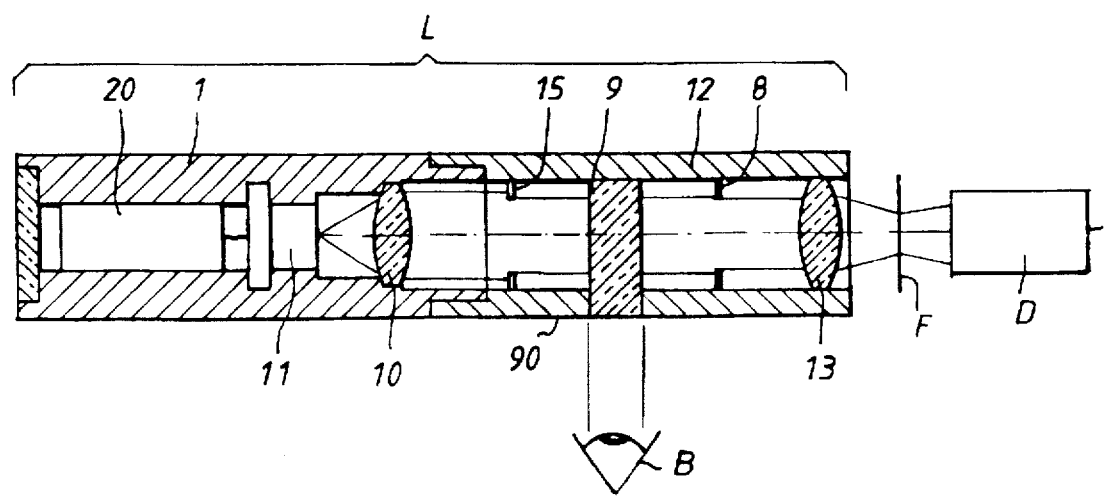
FIG. 2 is identical, being an orthogonal section of the same.

FIG. 2 shows an identical arrangement in a vertical sectional plane in comparison with FIG. 1, therefore emphasising its elliptical symmetry. The divergence of the light beam emitted by the laser diode 11 is at its maximum in this plane, corresponding to the width of a parallel beam formed by the collimator lens 10, unchanged by the cylindrical lens 9, the axis of which is located in the plane of the drawing, thus allowing the aperture slot 8 to be illuminated over its full length.

Simultaneously, FIG. 2 shows an example of an arrangement for visual inspection of laser diode functions:

The cylindrical lens 9 passes sideways through the socket—part 12—with the inspection window 90 forming its side face, illuminated by scattered light from the lens 9 and easy to inspect by the naked eye B of an operator.

Alternatively, for instance, an optical fibre may be introduced in the space between the collimator 10, the cylinder lens 9 and the aperture slot 8, ending in the margin of the light beam, with the other end of the optical fibre being generously arranged at a point of the sound film projector for easy access by the operator.

Should the operator detect failure of the red light in the inspection window 90, the replaceable assembly 1 may be rapidly and easily exchanged against a spare part, thus reinstating the sound film projector to be fully operational.

Permanently set aperture slots, for instance, are manufactured by photolithography and etching of metal foil onto transparent carriers, provided, however, that light is refracted and dispersed when passing through the said carrier.

For the conditions of an optical sound head, an aperture slot has proved to be of advantage, consisting of an unsupported foil or a metal sheet, with the width and length of the gap being well defined, including smooth edges cut by a laser beam, followed by pickling (prior to deburring).

A metal sheet of 0.03 mm thickness, consisting of chromium nickel steel, for instance, is provided with a slot of 30 μm width and 6.00±0.05 mm length.

This is imaged on the film plane (F reduced by a factor of 2.5.

No other component is required for definition of the effective slot length in the beam path due to precision manufacture, with the slot aperture therefore being the only image-limiting aperture of the optical sound head and no adjustment facilities being required for the slot dimensions.

Figure 3:
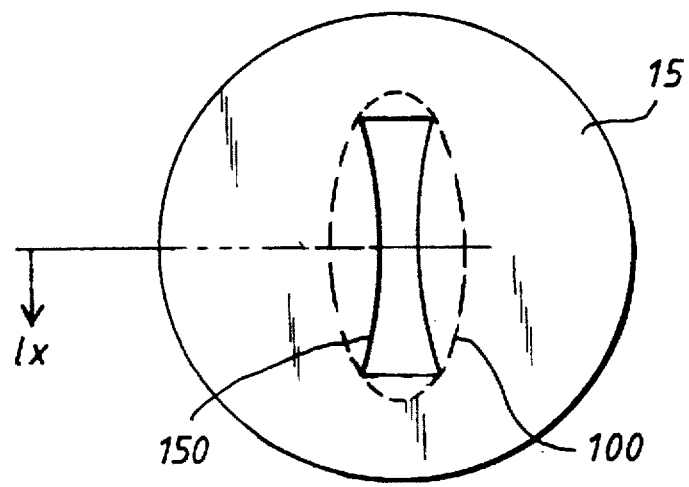
FIG. 3 is a diagram of an additional aperture in an elliptical light beam.

FIG. 3 shows the effect of an additional aperture 15, being arranged in the beam path prior to the aperture slot 8, preferably in the parallel elliptical light beam between the collimator lens 10 and the cylindrical lens 9.

Uniform lighting of the slot image on the sound track of the film F is required for distortion-free playback of analogue sound, with changes in light intensity causing a non-linear response characteristic, being of particular importance for large amplitude strokes, with the curvature of the response characteristic corresponding to the high signal-to-noise ratio. In comparison with a typical intensity distribution over the slot length of a collimated laser beam, inhomogeneity may be reduced by adding a cylindrical lens 9 of ±1.1 dB to typically ±0.2 dB.

When combining a cylindrical lens 9 with an intensity compensator aperture 15, as shown in FIG. 3, lighting of the aperture gap 8 will be even more uniform and therefore lighting of the slot image, reducing the signal-to-noise ratio even further.

The beam section of the laser diode 1 is elliptical, with its vertical intensity distribution coinciding with the slot length, effecting a reduction in slot lighting from its centre towards its ends. The parallel component is concentrated by the cylindrical lens 9 to a line in the focus of the cylindrical lens 9, therefore not having any major effect on the intensity distribution of the slot lighting.

It is the object of the intensity compensator aperture 15 including an aperture 150 to curtail parallel intensity distribution (I (1×)) by narrowing the appropriate beam section 100, as shown in FIG. 3, thus compensating the vertical intensity distribution by variation of the parallel component.

The cylindrical lens 9 combines the intensity distribution in the focus, generated by an additional aperture 15, in one line, used for lighting an aperture slot 8.

The slot lighting is constant over the full slot length, with variations only resulting from mechanical faults in the actual slot width.

The accurate geometry of the cutout 150 of the additional aperture 15 is not limited to the example of FIG. 3. This may be calculated empirically or by simulation framing and is naturally dependent on the divergence distribution of the laser diode 11 employed. The said design is preferably made by laser cutting a metal sheet or foil or even etching, as for the aperture slot 9.

When using an optical sound head L for digital sound scanning, homogeneity of the slot lighting is not so important but it is sensible.

Arrangement of the optical sound head L in a sound film projector is preferably provided outside the capstan.

We claim:

1. An optical sound head, consisting of the following:
   a replaceable assembly (1), containing
   a laser diode (11) of narrow-band emission in a visible range of the spectrum and an elliptical beam divergence,
   a collimator (10)
   another assembly (12) having a cylindrical lens (9), a cylindrical axis of which is provided in the direction of the large semi-axis of the elliptical beam divergence of the laser diode.
   a fixed aperture slot (8) consisting of an unsupported slotted opaque carrier, being provided in the direction of the cylinder axis of the cylindrical lens,
   a reducing lens (13), providing a reduced image of the aperture slot (8) on a film plane (F),
   an inspection window (90), and
   an arrangement diverging visible light from the beam path of the optical sound head (L) to the inspection window (90).

2. An optical sound head according to claim 1, wherein the replaceable assembly (1) includes components (20) of the electronic operating system of the laser diode (11).

3. An optical sound head according to claim 1 or 2, wherein the aperture slot (8) is the only image-limiting aperture of the optical sound head.

4. An optical sound head according to claim 1, wherein the said replaceable assembly (1) and the other assembly (12) of the optical sound head are releasably interconnected by socket means (111,121) in order to enable repeatable connection and disconnection of the assemblies.

5. An optical sound head according to claim 1, wherein the cylindrical lens (9) passes the laser diode beam through the other assembly (12) in an axial direction, and simultaneously diverges said visible light to the inspection window (90).

6. An optical sound head according to claim 1, wherein the the light diverging arrangement comprises a fibre-optic device for absorbing light from the margin of the laser light beam between the collimator (10) the cylindircal lens (9) and the slot (8).

7. An optical sound head according to claim 3, wherein an additional aperture (15) is provided between the laser diode (11) and the aperture slot (8), reducing the light intensity reaching the centre of the said aperture slot (8).

8. A sound film projector including an optical sound head (L) according to claim 1, wherein a spectrally selective photo detector (D), adapted to the emission of a laser diode (11), is provided.

9. A sound film projector including an optical sound head (L) according to claim 1, wherein the replaceable assembly (1) is provided for easy external access and the inspection window (90) is observable from outside the sound head.

10. An optical sound head, comprising
- a first, replaceable housing (1) containing a laser diode (11) for emitting a laser beam of narrow-band emission in a visible range of the spectrum and an elliptical beam divergence,
- a second housing (12) having mounted therein a cylindrical lens (9) disposed to be positioned in the path of the laser beam emitted by the laser diode,
- socket means (111, 121) releasably interconnecting said first housing (1) to said second housing (12) in order to enable repeatable connection and disconnection of said housings;
- a collimator lens (10) mounted in one of said housings (1, 12) between said laser diode (11) and said cylindrical lens (9) to make the laser beam an elliptical parallel beam,
- a fixed aperture slot (8) mounted in said second housing adjacent said first lens (9) and comprising an opaque carrier having therein a slot extending in the same direction as the axis of the cylindrical lens, and
- a reducing lens (13) in said second housing providing a reduced image of the aperture slot (8) on a film plane (F).

11. An optical sound head as defined in claim 10, wherein said collimator lens (10) is mounted in said first housing (1).

* * * * *